US008613432B2

(12) United States Patent
Chou et al.

(10) Patent No.: US 8,613,432 B2
(45) Date of Patent: Dec. 24, 2013

(54) POSITIONING FIXTURE

(75) Inventors: Yi-Lung Chou, Tu-Cheng (TW); Hung-Chieh Chang, Tu-Cheng (TW); Chi-Chung Huang, Tu-Cheng (TW); Li-Ping Chen, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 406 days.

(21) Appl. No.: 13/012,533

(22) Filed: Jan. 24, 2011

(65) Prior Publication Data

US 2012/0032381 A1 Feb. 9, 2012

(30) Foreign Application Priority Data

Aug. 6, 2010 (CN) .......................... 2010 1 0247296

(51) Int. Cl.

| | |
|---|---|
| ***B25B 11/00*** | (2006.01) |
| ***B25B 1/20*** | (2006.01) |
| ***B23Q 1/00*** | (2006.01) |
| ***B23Q 3/14*** | (2006.01) |

(52) U.S. Cl.
USPC .................. 269/8; 269/43; 269/47; 269/48.1

(58) Field of Classification Search
USPC .................. 269/8, 48.1, 43, 47, 66, 229, 231
See application file for complete search history.

(56) References Cited

U.S. PATENT DOCUMENTS

| | | | | |
|---|---|---|---|---|
| 7,147,412 | B2 * | 12/2006 | Davis | 408/115 R |
| 2002/0135449 | A1 * | 9/2002 | Menard | 335/289 |

* cited by examiner

*Primary Examiner* — Lee D Wilson
*Assistant Examiner* — Seahee Yoon
(74) *Attorney, Agent, or Firm* — Altis Law Group, Inc.

(57) ABSTRACT

A fixture includes a holding apparatus, a receiving block, and an attachment rod. The holding apparatus defines a through hole. The receiving block is mounted on the holding apparatus. A receiving opening is defined in the receiving block. The receiving opening is aligned with the through hole. An attachment rod includes a body which includes ferromagnetic materials. The body is configured to be received in the through hole.

20 Claims, 3 Drawing Sheets

POSITIONING FIXTURE

BACKGROUND

1. Technical Field

The present disclosure relates to manufacturing, and particularly to a fixture for positioning a workpiece.

2. Description of Related Art

In manufacturing, a workpiece, such as a magnet, must be securely positioned on a worktable or other surface. However, if a magnet is to be positioned in an environment including ferromagnetic material in its structure, problems can occur due to attraction between the magnet and the surroundings.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
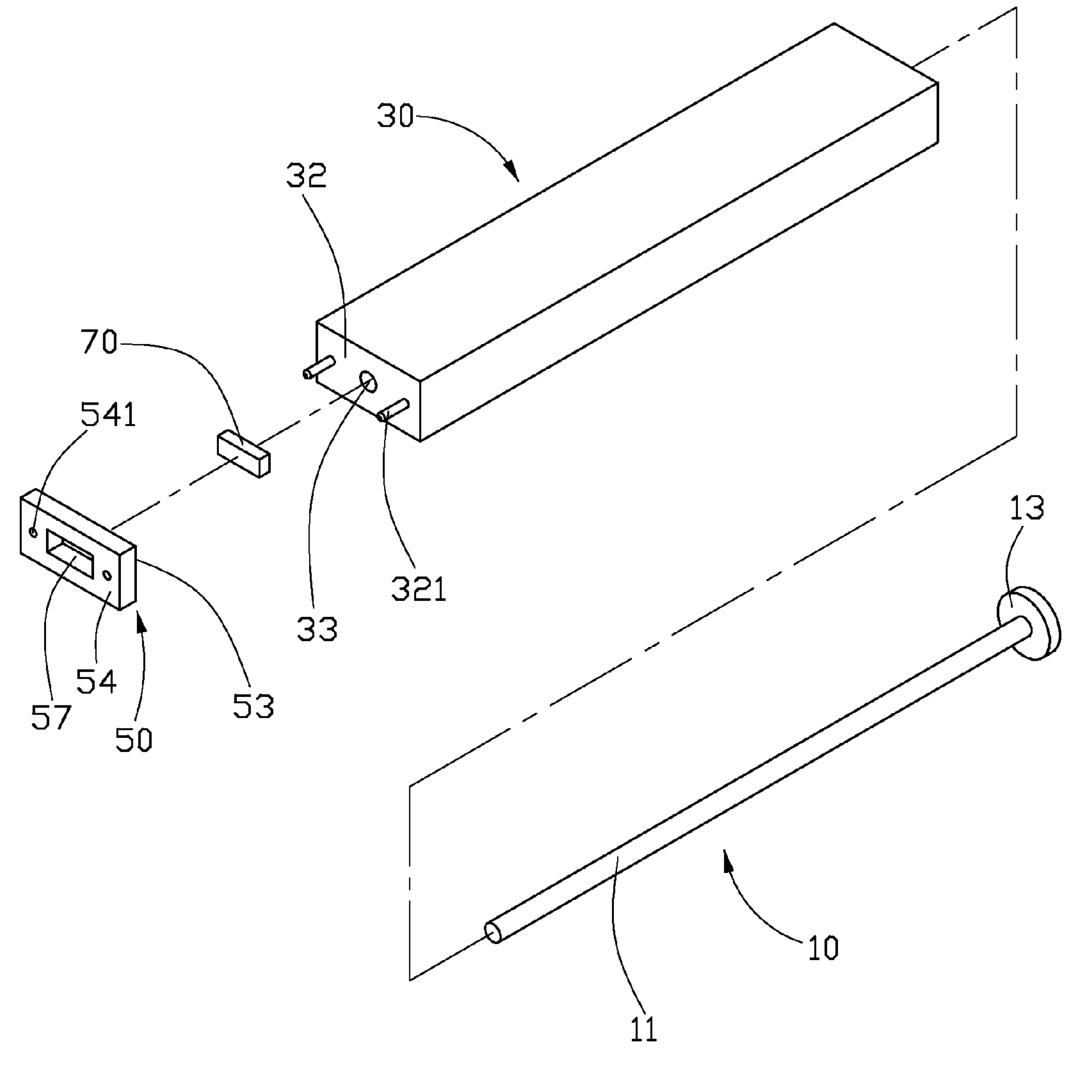
FIG. 1 is an isometric and exploded view of a positioning fixture in accordance with one embodiment.
Figure 2:
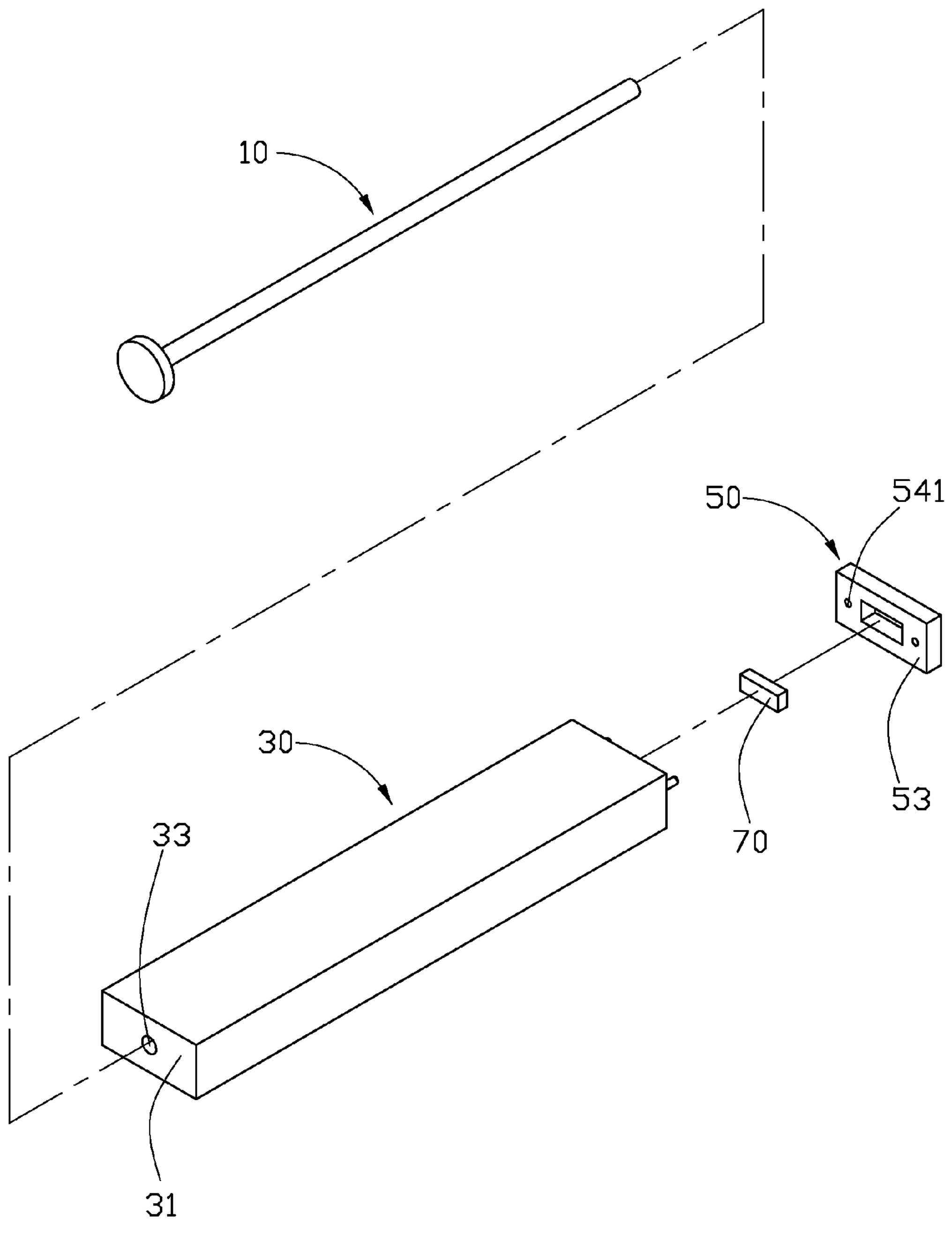
FIG. 2 is similar to FIG. 1, but viewed from another aspect.

Referring to FIGS. 1 and 2, a positioning fixture for a magnet 70 in accordance with an embodiment includes an attachment rod 10, a holding apparatus 30, and a receiving block 50. In one embodiment, the magnet 70 is square.

The attachment rod 10 includes a head 13 and body 11 attached thereto. The head 13 is connected to an end of the body 11. The body 11 is ferromagnetic material, such as steel or iron, which can attract the magnet 70 thereto.

The holding apparatus 30 is generally a square block of non-ferromagnetic material, such as plastic. The holding apparatus 30 includes a first sidewall 31 and a parallel second sidewall 32. A through hole 33 is defined between the first sidewall 31 and the second sidewall 32, extending through the holding apparatus 30. The body 11 is longer than the through hole 33. A diameter of the through hole 33 exceeds that of the body 11, so the through hole 33 can receive the body 11 therein. The diameter of the through hole 33 is smaller than that of the head 13. The second sidewall 32 has two securing pins 321 located thereon. On the second sidewall 32, the through hole 33 is located between the two securing pins 321.

The receiving block 50 is also non-ferromagnetic material, and includes a third sidewall 53 and a fourth sidewall 54 parallel to the third sidewall 53. The third sidewall 53 and the second sidewall 32 are also parallel, and of the same shape and size. The receiving block 50 defines two securing holes 541 corresponding to the two securing pins 321. A receiving opening 57 is defined between the third sidewall 53 and the fourth sidewall 54. The receiving opening 57 extends through the receiving block 50. A shape of the receiving opening 57 is similar to that of the magnet 70, and a scale of the receiving opening 57 exceeds that of the magnet 70. On the third sidewall 53, the receiving opening 57 is located between the two securing holes 541.

Figure 3:
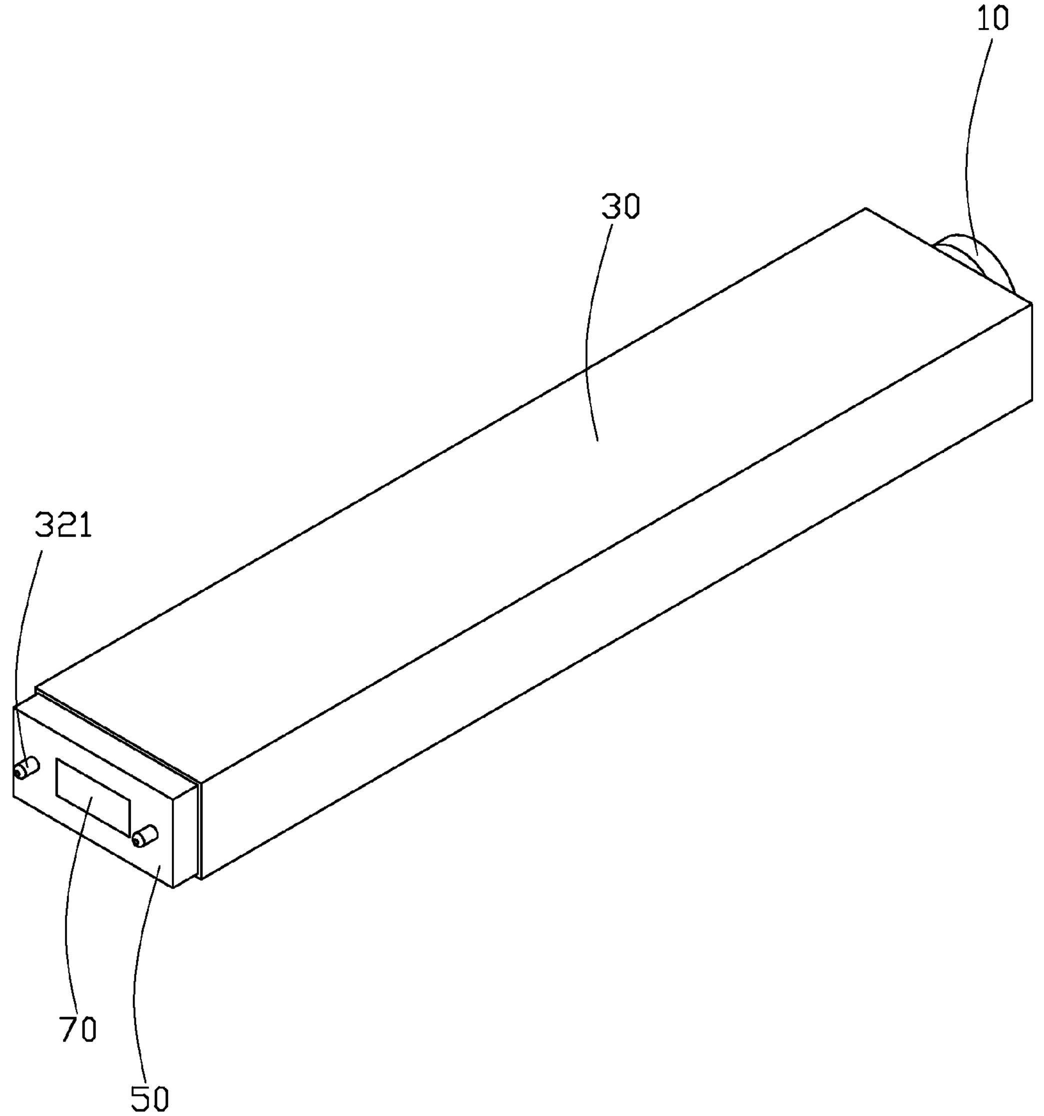
FIG. 3 is an assembly view of the fixture of FIG. 1.

Referring to FIGS. 1 to 3, in assembly of the fixture, the securing pins 321 of the holding apparatus 30 are secured in the securing holes 541 of the receiving block 50. The second sidewall 32 of the holding apparatus 30 contacts the third sidewall 53 of the receiving block 50. The securing pin 321 extends through corresponding securing hole 541, and extends over the fourth sidewall 54 of the receiving block 50. In this position, the receiving opening 57 of the receiving block 50 is aligned with the through hole 33 of the holding apparatus 30. The magnet 70 is received in the receiving opening 57 and located on the second sidewall 32 of the holding apparatus 30. The body 11 of the attachment rod 10 enters the through hole 33 from the first sidewall 31. A free end of the body 11 extends through the through hole 33 and magnetically fixes the magnet 70.

When the magnet 70 is to be mounted in an installation site, the fixture with the magnet 70 is moved to align the receiving opening 57 with the installation site. The body 11 is drawn out of the through hole 33, separating the magnet 70 from the free end thereof, and locating in the installation site precisely.

In the fixture, the securing pins 321 extend beyond the fourth sidewall 54, and can serve to position the fixture such that the receiving opening 57 aligns with the installation site.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A fixture, comprising:

a holding apparatus defining a through hole;

a receiving block mounted on the holding apparatus, a receiving opening defined in the receiving block, the receiving opening aligned with the through hole, an extending direction of the receiving opening being same as an extending direction of the through hole, a magnet located in the receiving opening; and an attachment rod comprising a body which comprises ferromagnetic materials, wherein the body is configured to be inserted in the through hole to access the receiving opening to absorb the magnet thereon.

2. The fixture of claim 1, wherein the holding apparatus comprises a first sidewall and a second sidewall, and the through hole extends through the first sidewall and the second sidewall.

3. The fixture of claim 2, wherein the holding apparatus comprises two securing pins located on the second sidewall, the receiving block defines two securing holes, and the two securing pins are secured in the two securing holes.

4. The fixture of claim 3, wherein on the second sidewall, the through hole is located between the two securing pins.

5. The fixture of claim 2, wherein the receiving block comprises a third sidewall and a fourth sidewall that is parallel to the third sidewall, and the third sidewall contacts the second sidewall of the holding apparatus.

6. The fixture of claim 5, wherein the receiving opening extends through the third sidewall and the fourth sidewall.

7. The fixture of claim 2, wherein the body is longer than the through hole, and the body is configured to insert in the through hole from the first sidewall.

8. The fixture of claim 1, wherein the attachment rod further comprises a head, a diameter of the through hole is larger than that of the body, and smaller than that of the head.

9. The fixture of claim 1, wherein the holding apparatus and the receiving block substantially consist of non-ferromagnetic materials.

10. An assembly, comprising:

a receiving block defining a receiving opening, a magnet located in the receiving opening;

a holding apparatus mounting the receiving block thereon;

an attachment rod slidably mounted in the holding apparatus, the attachment rod comprising a body that comprises ferromagnetic materials, wherein the body moves between a first position and a second position; in the first position, the body is located in the receiving opening to absorb the magnet thereon; in the second position, the body is out of the receiving opening to disengage the magnet.

11. The assembly of claim 10, wherein the holding apparatus defines a through hole, and the body is received in the through hole.

12. The assembly of claim 11, wherein the through hole is aligned with the receiving opening, and an extending direction of the receiving opening being same as an extending direction of the through hole.

13. The assembly of claim 11, wherein the holding apparatus comprises a first sidewall and a second sidewall, and the through hole extends through the first sidewall and the second sidewall.

14. The assembly of claim 13, wherein the holding apparatus comprises two securing pins located on the second sidewall, the receiving block defines two securing holes, and the two securing pins are secured in the two securing holes.

15. The assembly of claim 14, wherein on the second sidewall, the through hole is located between the two securing pins.

16. The assembly of claim 13, wherein the receiving block comprises a third sidewall and a fourth sidewall that is parallel to the third sidewall, and the third sidewall contacts the second sidewall of the holding apparatus.

17. The assembly of claim 16, wherein the receiving opening extends through the third sidewall and the fourth sidewall.

18. The assembly of claim 13, wherein the body is longer than the through hole, and the body is configured to insert in the through hole from the first sidewall.

19. The assembly of claim 11, wherein the attachment rod further comprises a head, a diameter of the through hole is larger than that of the body, and smaller than that of the head.

20. The assembly of claim 10, wherein the holding apparatus and the receiving block primarily consist of non-ferromagnetic materials.

* * * * *